April 28, 1970 JAMES E. WEBB 3,509,551
ADMINISTRATOR OF THE NATIONAL AERONAUTICS
AND SPACE ADMINISTRATION
MAGNETIC CORE CURRENT STEERING COMMUTATOR
Filed Dec. 19, 1967 4 Sheets-Sheet 1

INVENTOR.
LAWRENCE J. ZOTTARELLI
BY
ATTORNEYS

April 28, 1970 JAMES E. WEBB 3,509,551
ADMINISTRATOR OF THE NATIONAL AERONAUTICS
AND SPACE ADMINISTRATION
MAGNETIC CORE CURRENT STEERING COMMUTATOR
Filed Dec. 19, 1967 4 Sheets-Sheet 2

INVENTOR.
LAWRENCE J. ZOTTARELLI
BY
ATTORNEYS

April 28, 1970 JAMES E. WEBB 3,509,551
ADMINISTRATOR OF THE NATIONAL AERONAUTICS
AND SPACE ADMINISTRATION
MAGNETIC CORE CURRENT STEERING COMMUTATOR
Filed Dec. 19, 1967 4 Sheets-Sheet 3

INVENTOR.
LAWRENCE J. ZOTTARELLI
BY
ATTORNEYS

April 28, 1970 JAMES E. WEBB 3,509,551

ADMINISTRATOR OF THE NATIONAL AERONAUTICS AND SPACE ADMINISTRATION

MAGNETIC CORE CURRENT STEERING COMMUTATOR

Filed Dec. 19, 1967 4 Sheets-Sheet 4

INVENTOR.

LAWRENCE J. ZOTTARELLI

BY

ATTORNEYS

United States Patent Office 3,509,551
Patented Apr. 28, 1970

3,509,551

MAGNETIC CORE CURRENT STEERING COMMUTATOR

James E. Webb, Administrator of the National Aeronautics and Space Administration, with respect to an invention of Lawrence J. Zottarelli, Los Angeles, Calif.

Filed Dec. 19, 1967, Ser. No. 691,738
Int. Cl. G11c *7/00, 19/00;* H04q *1/52*
U.S. Cl. 340—174 8 Claims

ABSTRACT OF THE DISCLOSURE

A switch for steering bipolar current pulses to any one of a plurality of current-utilizing memory words. Each word is associated with a pair of magnetic cores, each core within the pair is from a different core group. Initially, all the cores except one in the first group are reset. The cores are inductively coupled together with diodes so that a positive current pulse resets the previously set core of the first group. The reset core forward biases a diode, causing the current pulse to be steered to a word coupled to the particular reset core. Also the steered current sets a core of the second group. Then, when a negative pulse is supplied the last set core in the second group is reset by the negative pulse, forward biasing a diode which causes the negative pulse to be steered through a word associated with the core of the second group. Also, a core in the first group is set to respond to a subsequently supplied positive pulse.

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

Field of the invention

This invention generally relates to current-steering switches and, more particularly, to a circuit utilizing magnetic cores to steer bipolar current pulses to a plurality of current-utilizing elements.

Description of the prior art

Advances in the computer art have led to the development of various current-steering switches which are particularly useful in providing current pulses to selected words in a memory matrix. Generally bipolar current pulses are required. Pulses of one polarity are used for word write purposes while pulses of an opposite polarity are used for interrogating or for reading word content.

In order to simplify the memory construction which is a sought after goal, both from performance and cost points of view, attempts have been made to design memories which require a minimum number of wires or lines. In a memory, utilizing magnetic cores as the storage elements, a reduced number of wires is most significant, since it reduces the number of windings with which each core is wound. In addition it is desirable that the circuitry, used to select the word to which bipolar current pulses are to be supplied, be as simple as possible, yet reliable to insure proper memory addressing. It is to provide such a current-steering switching arrangement that the present invention is directed.

OBJECTS AND SUMMARY OF THE INVENTION

It is a primary object of the present invention to provide a new improved arrangement for steering bipolar current pulses to a plurality of current-utilizing elements.

Another object of this invention is to provide an improved bipolar current pulses steering commutator.

A further object of this invention is the provision of a bipolar current pulses steering commutator which utilizes magnetic cores.

Still a further object of this invention is to provide a commutator with magnetic cores which require a minimal number of windings to steer current pulses of opposite polarities to any one of a plurality of current-utilizing elements.

These and other objects are achieved by providing a commutator in which magnetic cores are arranged in two groups. A pair of cores, one from each group is associated with each current-utilizing element such as a word or a word line of a memory. The cores are of the type which have two stable states of magnetic remanence between which each core can be driven. These states will hereafter be referred to as the set and clear states.

The cores of the first group are interconnected and inductively coupled, so that when a positive polarity current pulse is applied, one of the cores of the first group which is in a non-quiescent or set state is driven to its quiescent or clear state. As a result, a diode is forward biased so that the positive polarity current pulse could be steered to the word line associated with the particular core which changes states.

The particular core is coupled to a core in the second group so that the steered current pulse switches the particular core of the second group to the set state. Then, when a negative polarity pulse is applied it switches the switched core of the second group back to its clear state, forward biasing a diode so that the negative polarity pulse can be steered to the word line associated with the second group core. Similarly, when the latter core is switched back to its clear state it causes a first group core to switch to its set state to respond to a subsequently supplied positive pulse.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
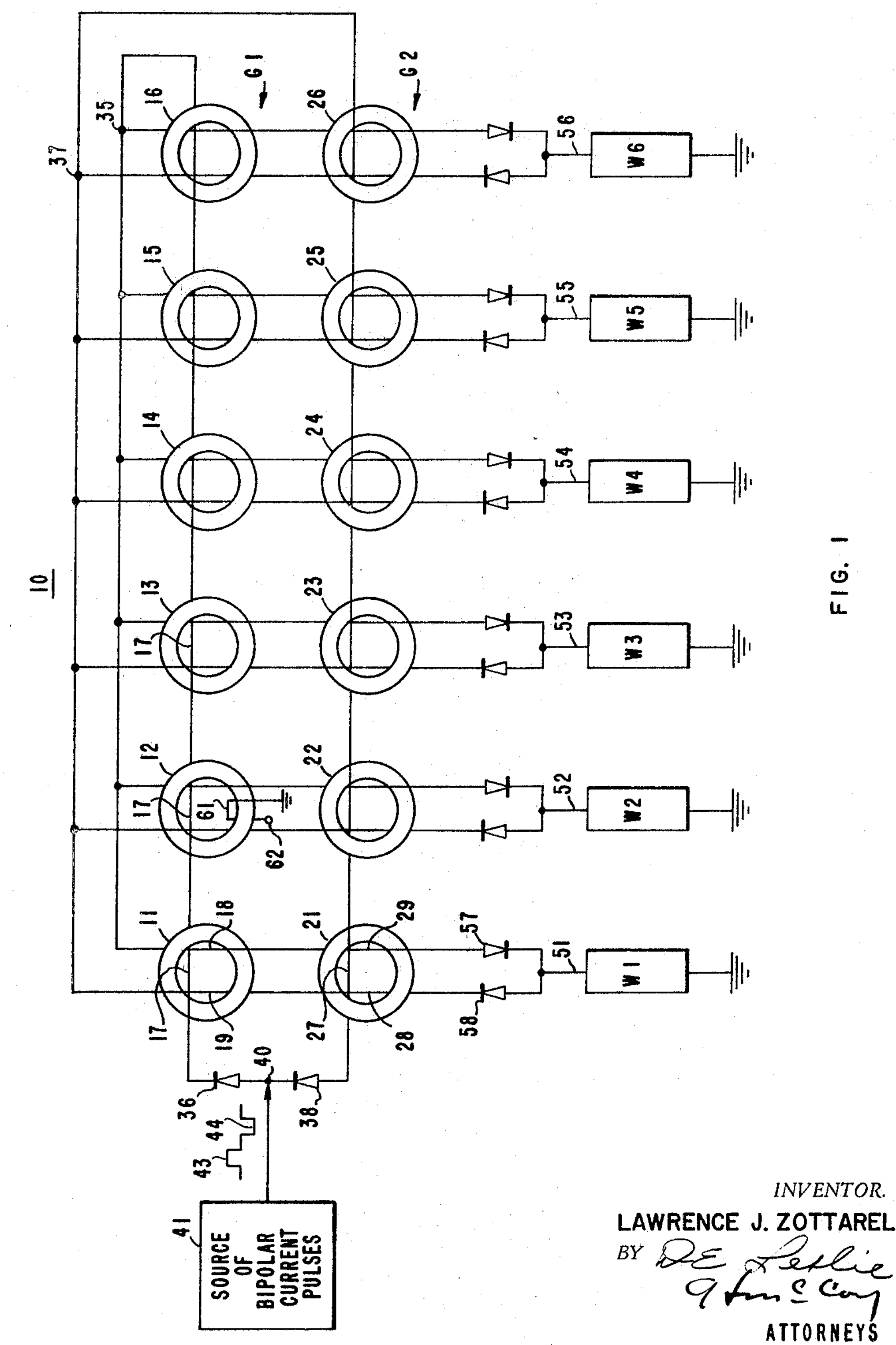
FIGURE 1 is a simple schematic diagram useful in explaining the principles of the present invention.

Reference is now made to FIGURE 1 which is a simple schematic diagram of an exemplary embodiment of the current-steering commutator of the present invention. The particular exemplary embodiment is assumed to be one which is capable of steering bipolar current pulses, hereafter simply referred to as bipolar pulses, to any one of six current-utilizing elements, such as memory words W1 through W6. The commutator designated 10 includes two core groups G1 and G2, each of six single aperture magnetic cores, designated 11–16 and 21–26, respectively. Each core is of the type which has two states of magnetic remanence such as set and clear, and drivable therebetween. Each core in group G1 is inductively coupled to three windings, an input winding 17, an output winding 18 and a state-control winding 19. Each core in group G2 is similarly coupled by an input winding 27, an output winding 28 and a state-control winding 29. The windings whose function will hereafter be described in detail are shown for explanatory purposes as single turn windings.

The input windings 17 of the cores in group G1 are connected in series between a common terminal 35 and the cathode of a diode 36, whose anode is connected to an input terminal 40. Likewise, the input windings 27 of the cores in group G2 are connected in series between a common terminal 37 and the anode of a diode 38 whose cathode is also connected to input terminal 40. The latter is connected to a source of bipolar current pulses 41, whose function is to supply a sequence of current pulses, alternate pulses being of the same polarity. Thus, if odd pulses are assumed to be of a positive polarity the even pulses have a negative polarity. A sequence of two pulses, a positive pulse 43 and a negative pulse 44 are shown between source 41 and input terminal 40.

Each memory word is associated with a pair of cores, one core from each group. The output winding 18 of the core from group G1 and the state-control winding 29 of the core from G2 are connected in series between terminal 35 and the anode of a diode whose cathode is connected to the word line of the particular memory word. Likewise, the output winding 28 of the core of G2 and the state-control winding 19 of the core from group G1 are connected in series between terminal 37 and the cathode of a diode whose anode is also connected to the word line.

Briefly, a positive pulse is steered to any word when its core in G1 changes from a nonquiescent state to a quiescent state, while a negative pulse is steered to a word when the core from G2 associated with the word changes from a nonquiescent state to a quiescent state. Hereafter the quiescent state will be referred to as the clear state and the nonquiescent as the set state. In FIGURE 1 cores 11 and 21 are associated with W1, 12 and 22 with W2, etc. The word lines of W1 through W6 are designated 51–56 respectively and the two diodes associated with each line are numbered 57 and 58.

In operation, prior to the supply of a positive pulse such as 43, all the cores except one in group G1 are in the clear state and the single core is in a set state. Let it be assumed that core 11 is set. Then, when positive pulse 43 is supplied from 41 current flows through diode 36 and the input windings 17 of the cores in G1. The current tends to switch the cores to their clear state. However, since all but core 11 are already in such state the current only affects the state of core 11. It switches it to its clear state. As the core switches, it generates a voltage across its output winding 18 which forward biases diode 57 connected in series therewith. This forward bias permits current pulse 43 to be steered through state-control winding 29 of core 21 and diode 57 to the word line 51 of W1. Thus a positive current pulse is applied to W1. As the current pulse 43 passes in winding 29 of core 21, it induces an electromagnetic force sufficient to switch core 21 from its previous clear state to its set state.

It should be pointed out that the voltage induced by winding 18 of core 11 forward biases only diode 57 connected in series therewith, while the other diodes 57 remain back biased. Also, the positive pulse which is steered into line 51 produces a positive voltage which forward biases diode 58 associated with W1. However, the positive voltage at the cathode of 58 is not detrimental since it in turn back biases through common terminal 37 all the diodes 58 associated with the other words. Thus, the positive current pulse is only steered to word W1.

After such positive current pulse steering all the cores, except 21, are in the clear state, while core 21 is in a set state. When the succeeding negative pulse 44 is applied at 40, it tends to drive the cores of G2, via their input windings 27, to their clear states. However since only 21 is not in such state, only it switches. This induces a voltage in its output winding 28 which forward biases diode 58, connected in series therewith. Thus, a negative current pulse is steered through word W1. Here again it should be pointed out that a negative voltage at the cathode of 57 occurs due to the negative pulse in 51. This voltage forward biases diode 57. However the negative voltage at its anode is reflected through common terminal 35 at the anode of each of the other diodes 57, thereby back biasing them. Consequently, the negative pulse is steered only through word W1.

This pulse which passes through winding 19 of core 11 switches the core from the clear to the set state. Thus, after the negative pulse is steered only core 11 is in the set state, returning the commutator to the original condition, after successively steering positive and negative pulses through word W1.

From the foregoing it should be appreciated that any subsequent pair of positive and negative pulses would also be steered to word W1 through line 51. If pulses have to be steered to another word, core 11 has to be cleared first and then the core in G1 associated with the particular word set, to respond to the positive pulse to be supplied. As is appreciated by those familiar with the art, the clearing of any of all cores may be accomplished by providing a bias current to each core from a bias source (not shown). Also, setting any core in G1 may be accomplished by an additional winding on the core for the specific setting purpose. Such an exemplary winding is shown in FIGURE 1 wound about core 12. It is designated 61 and shown connected between ground and terminal 62. When a positive pulse is applied to terminal 62 core 12 would be set if it is in a clear state. A similar setting winding is assumed to be associated with each G1 core. If the first pulse to be steered to a word is a negative pulse the setting windings 61 would be wound about the cores in G2.

The number of setting windings 61 could be reduced to one if the sequence of current pulses to be steered to words W1–W6 is fixed and predetermined. By the proper connection of the output winding 18 of a G1 core and the state-control winding 29 of G2 core and similarly by the proper connection of windings 28 and 19, the desired current-steering sequence may be achieved.

Figure 2:
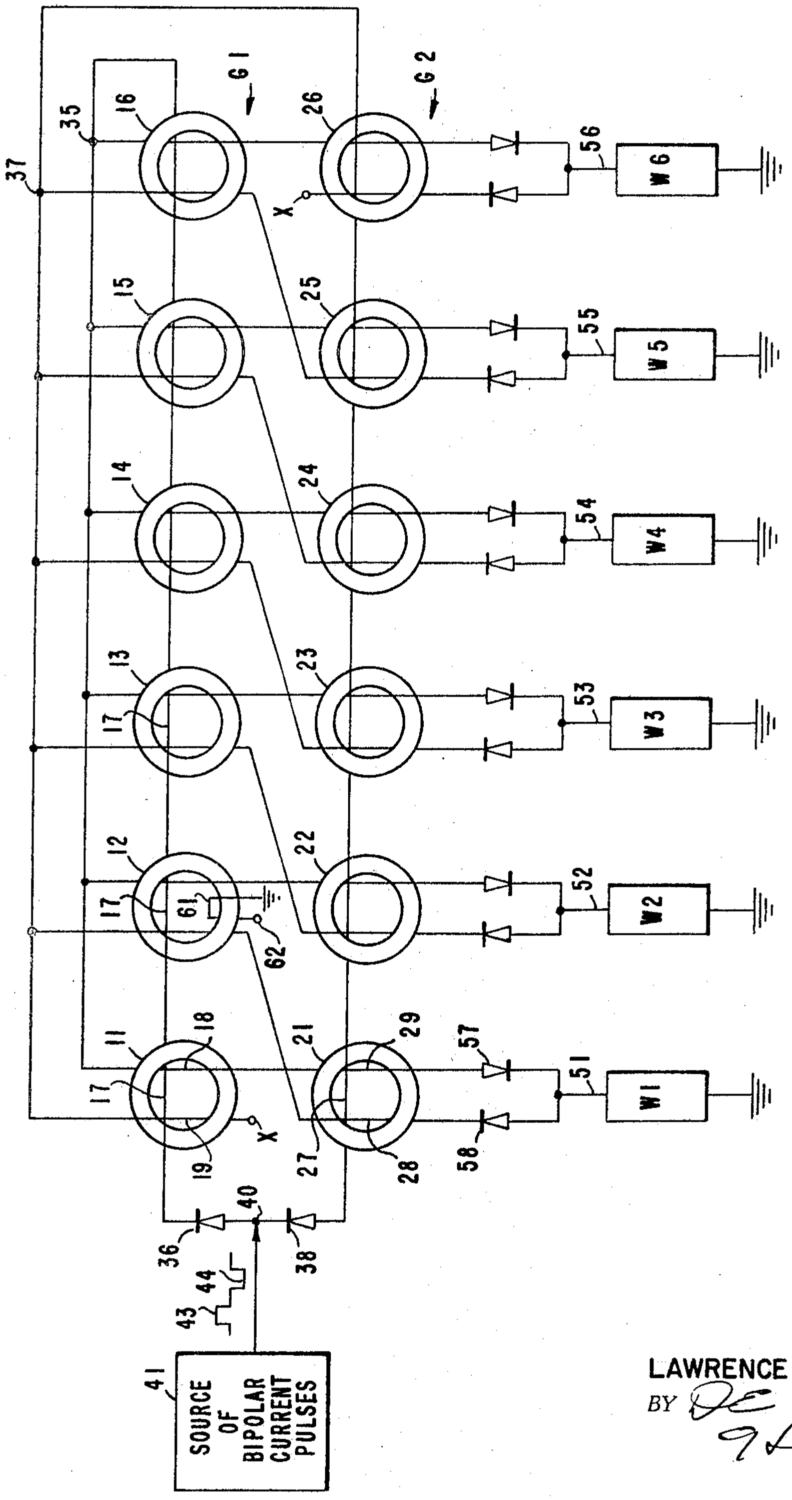
FIGURE 2 is a schematic diagram of one embodiment of the bipolar current-steering switch of the present invention.
Figure 3:
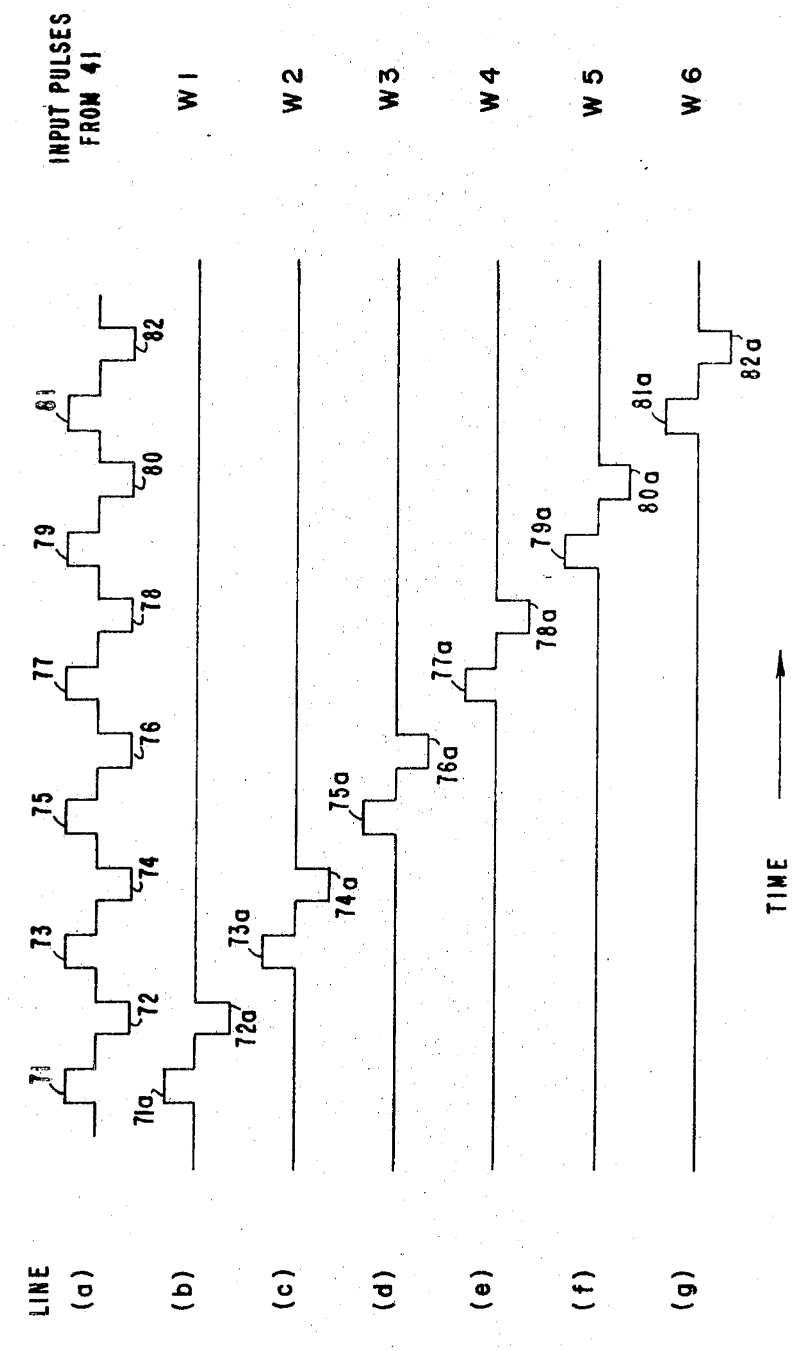
FIGURE 3 is a multiline waveform diagram, useful in explaining the operation of the switch of FIGURE 2.

One specific example of such a sequence is achievable with the arrangement shown in FIGURE 2 to which reference is made herein. Therein elements like those shown in FIGURE 1 are designated by like numerals. The particular commutator or arrangement of FIGURE 2 may best be explained in conjunction with FIGURE 3 which is a multiline time diagram of waveforms of the current pulses supplied from source 41 (FIGURE 3, line *a*), and the steered pulses to words W1 through W6 (lines *b* through *g*).

As seen from FIGURES 1 and 2, the only difference between the two embodiments is that in FIGURE 2 the output wniding 28 of each G2 core, such as 21, is connected in series with the winding 19 of the G1 core to the right, such as 12. Thus, when core 21 is cleared it does not set core 11, as previously described, but rather it sets core 12. Consequently, when the next positive pulse is supplied, it is steered to the next word, such as W2. In line *a* of FIGURE 3, the positive and negative pulses are designated 71 through 82.

Assuming that initially all cores except 11 are cleared, then from the foregoing it is apparent that when pulse 71 is applied it is steered as 71*a* to W1, also setting 21. Then when pulse 72 is applied it is steered as 72*a* to W1. This pulse clears core 21 and sets core 12. Then, when pulse 73 is applied it is steered through core 12 as 73*a* to W2. This process continues with each pair of pulses in the sequence being steered to a different word. The steered pulses are designated by the corresponding input pulses' numerals followed by the letter *a*, such as 71*a*, 72*a*, etc.

It should be stressed that pulses 71*a*–82*a* are not pulses which are induced in windings of cores which switch between states of magnetic remanence; rather they are the actual input pulses which are steered through the cores to the various words. Since a magnetic core which is switchable between two states of magnetic remanence, such as clear and set, can be regarded as a switch which is in either a closed or open position, the novel arrangement of the invention may be summaried as consisting of two groups of switches. A pair of switches, one from each group, is associated with each current utilizing element, such as a memory word.

All the switches of the first group are coupled so that when a positive current pulse is applied the pulse is steered to the element whose associated switch in the first group switches from an open position to a closed position. Also, all the second group switches are interconnected so that when a negative current pulse is applied it is steered to the element whose associated second group switch switches to the closed position. In addition the switches of both groups are connected so that when a group one switch switches from an open to a closed position, it switches one of the group two switches to an open position. Likewise, a group two switch which is driven to a closed position, opens one of the switches in the first group.

From the foregoing it should thus be appreciated that with the commutator of the present invention, bipolar current pulses could be steered to any one of a plurality of current-utilizing elements with relatively simple connections between a minimal number of windings on magnetic cores. Also, the particular connection combinations provide a high degree of flexibility for controlling the sequence in which the pulses are steered to the various current-utilizing elements.

Figure 4:
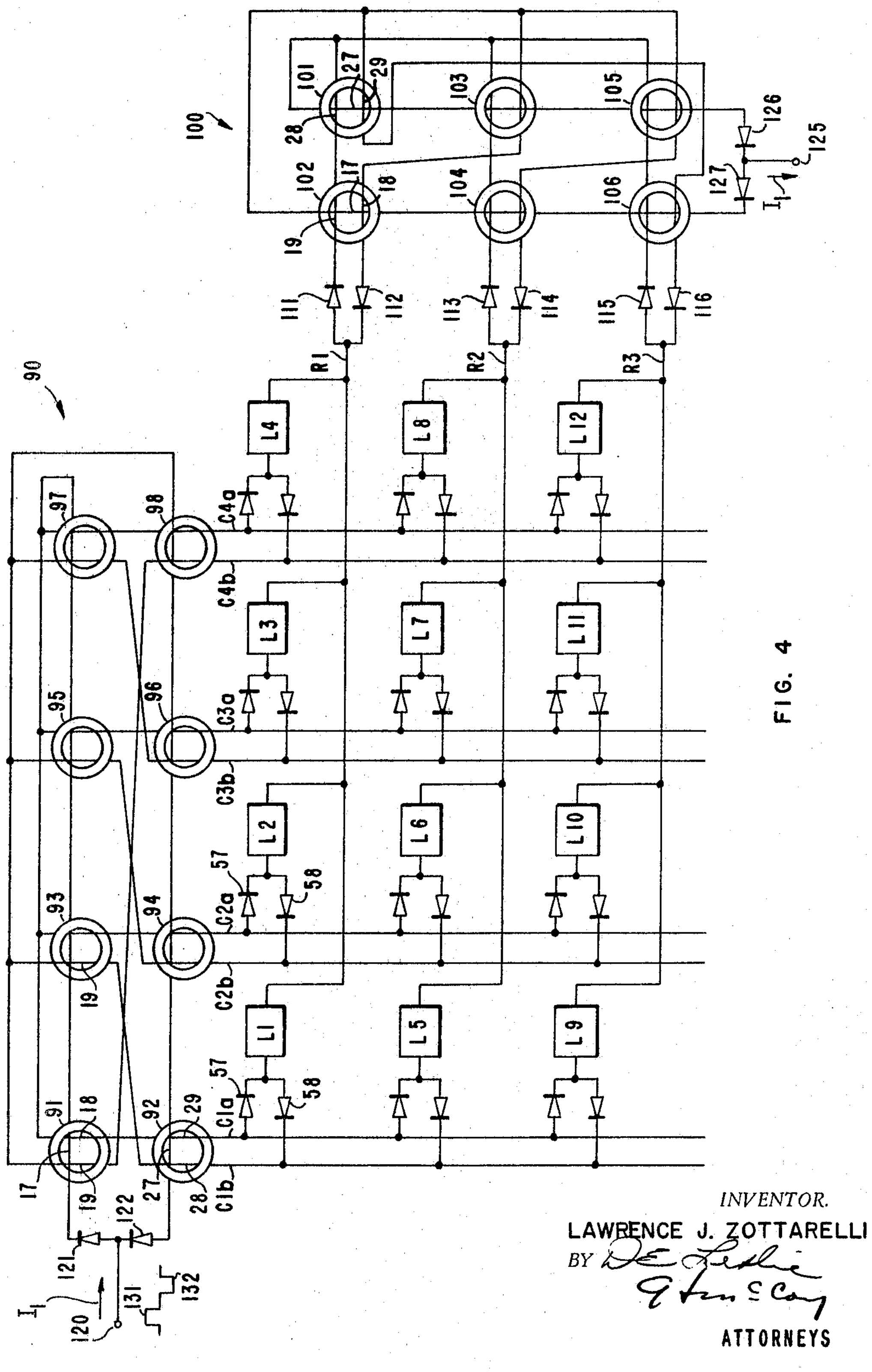
FIGURE 4 is a schematic diagram of another embodiment of the invention operating as a commutator to steer bipolar current pulses to each word in a word matrix.

Reference is now made to FIGURE 4 which is an exemplary embodiment of a pair of commutators constructed in accordance with the teachings of the present invention. These are used to access a matrix of memory words, by steering bipolar current pulses to any one of 12 words, designated L1 through L12. The matrix consists of four columns and three rows, and includes four pairs of column lines C1–C4. The lines in each pair are designated by *a* and *b* while the three row lines are designated R1, R2 and R3.

Commutator 90 with cores 91–98 is connected to the column lines, while commutator 100 with cores 101–106 is connected to the row lines R1, R2 and R3 through diodes 111–116. The input, output and state-control windings of each core are designated, as 17 or 27, 18 or 28, and 19 or 29, as before, depending on the core group. The input diodes of commutator 90 which are connected to a terminal 120 are designated 121 and 122 while a terminal 125 is connected to 100 through diodes 126 and 127.

For explanatory purposes, let it be assumed that cores 91 and 101 are in a set state and all other cores are in a clear state. Then when a positive current pulse 131 enters the network at point 120 and simultaneously exits at point 125, i.e., the voltage at 120 is positive with respect to 125 and diodes 121 and 126 are forward biased, it will flow through windings 17 of commutator 90 and through windings 27 of commutator 10. Consequently, cores 91 and 101 are switched to clear, Hence they generate voltages on windings 18 and 28 which forward bias diodes 57 of L1, L5, L9, and 111 of R1. The combined forward biasing of 47 of L1 and 111 of R1 enables positive pulse 131 to be steered through L1.

Briefly now, the positive current pulse 131 flows successively through point 120, diode 121, and then through windings 17 of cores 91, 93, 95 and 97. In so doing, it resets or clears core 91, so that it is steered through winding 18 of core 91, then through winding 29 of core 92, setting core 92. Therefrom, the pulse 131 flows successively through wire C1*a*, diode 57 of L1, L1, wire R1, diode 111, and winding 19 of core 102, setting the latter. Then it flows through winding 28 of core 101, through windings 27 of cores 101, 103, 105, resetting core 101. The pulse continues therefrom through diode 126, finally exiting through point 125.

Then, when a subsequent negative current pulse 132 enters the network at point 120 and simultaneously exits at point 125, the voltage at 120 is negative with respect to the voltage at 125 and diodes 122 and 127 are forward biased. The pulse flows through windings 17 of group 100 and windings 27 of group 90. Cores 92 and 102 are switched to clear and hence generate voltage on windings 28 of group 90 and windings 18 of group 100 which forward bias diodes 58 of L1, L5, L9 and diode 112 of R1. The combined forward biasing of diode 58 of L1 and of diode 112 of R1 enables negative pulse 132 to be steered through L1.

Briefly, now, the negative current pulse 132 flows successively through point 120, diode 122, and then through windings 27 of cores 92, 94, 96, and 98. In so doing it resets or clears core 92, and is then steered through winding 19 of core 93, the steering winding 28 of core 92, through wire C1*b*, and therefrom through diode 58 of L1, to L1. From L1 the pulse flows through wire R1, diode 112, and through steering windings 18 of core 102. The pulse continues through winding 29 of core 103, setting the latter, and continuing through windings 17 of cores 102, 104, 106 and through diode 127, exiting at point 125. The current pulse through winding 17 of core 102, drives the core to its clear state.

Thus, the first pair of bipolar current pulses are steered to L1 and at the end of this phase cores 93 and 103 are the only cores in the set state. Consequently, when succeeding positive and negative current pulses are applied they are steered to word L6. This sequence of operations would continue until each word is supplied in succession with the bipolar current pulses, The sequence of words supplied with the pulses is L1, L6, L11, L4, L5, L10, L3, L8, L9, L2, L7, and L12.

Although only 12 words are shown in FIGURE 4, it is appreciated that any desired number of words may be accessed by two novel commutators, taught and described herein. Also, the various output and state-control windings of the various cores may be connected differently from the arrangement shown in FIGURE 4 so that the sequence of accessed words may be modified.

Although particular embodiments of the invention have been described and illustrated herein, it is recognized that modifications and variations may readily occur to those skilled in the art.

What is claimed is:

1. In combination with a plurality of bipolar-current-utilizing elements, an arrangement for selectively steering received bipolar current pulses to any one of said elements comprising:

first and second groups of switches, each switch being a magnetic core having clear and set states of magnetic remanence and switchable therebetween, said clear and set states corresponding to closed and open switch positions, respectively;

first means interconnecting said first group of switches whereby a received position current pulse drives an open switch in said first group to a closed position;

second means interconnecting said second group of switches whereby a received negative current pulse drives any open switch in said second group to a closed position;

third means coupling said switches to said elements, each pair of switches including one from each group being coupled to at least one element, whereby a positive current pulse switching a first group switch to its closed position is steered to the element associated with said switched first group switch and a negative current pulse switching a second group switch to its closed position is steered to the element associated with said second group switch; and fourth means coupling said first and second group switches so that when any first group switch is closed it opens a second group switch associated therewith, and when any second group switch is closed it opens a first group switch associated therewith.

2. The arrangement as recited in claim 1 further including an input terminal to which the bipolar current pulses are applied, said first means include a separate input winding inductively coupled to each first group core, and means for serially connecting said input windings between the input terminal and a first common terminal, said second means including a separate input winding inductively coupling each second group core and means for serially connecting said input winding between said input terminal and a second common terminal.

3. The arrangement as recited in claim 2 wherein each core further includes an output winding and said third means include for each element first and second oppositely poled diodes, means connecting said first diode in series with the output winding of the core in the first group associated with the element, between said first common terminal and the element, means connecting said second diode in series with the output winding of the core in the second group which is associated with the element between said second common terminal and the element, whereby when a core is switched from a set to its clear state a potential is induced across the output winding thereof to forward bias the diode serially connected therewith.

4. The arrangement as recited in claim 3 wherein said fourth means include a state-control winding inductively coupled to each core and means serially connecting the state-control winding of each core in said first group with the output winding of a different second group core and means serially connecting the state-control winding of each second group core with the output winding of a different first group core.

5. In combination with a plurality of bipolar-current-utilizing elements, current steering means for selectively steering supplied bipolar currents to said elements comprising:

first and second groups of normally closed switches each switch being a magnetic core having clear and set states of magnetic remanence and switchable therebetween, said clear and set states corresponding to closed and open switch positions, respectively;

means coupling each element to a unique pair of said switches, each pair includes one switch from each group;

means for opening one of the switches in said first group;

means coupling each switch in said first group with a diifferent switch in said second group, and each switch in said second group with a different switch in said first group; and means for supplying said switches a sequence of bipolar switching current pulses, alternate pulses being of the same polarity, whereby the first pulse closes said one open switch in said first group supplying said pulse to the element with which it is coupled and opens the switch of the second group with which said one switch is coupled for subsequent supply of a succeeding current pulse to said element.

6. The arrangement as recited in claim 5 wherein each core is inductively coupled by an input winding, an output winding and a state-control winding, said arrangement further including means for coupling the output winding of a core in said first group in series with the state-control winding of a core in said second group, and for coupling the output winding of a core in said second group in series with the state-control winding of a core in said first group, and diode means for coupling the output windings of the cores of each pair with the element associated therewith.

7. The arrangement as recited in claim 6 further including means for coupling the input windings of the cores in said first group in series together with a first diode between an input terminal and a first common terminal, and means for coupling the input windings of the cores in said second group in series together with a second diode between said input terminal and a second common terminal, and means connecting the output windings of the cores in said first and second groups to said first and second common terminals, respectively.

8. The arrangement as recited in claim 7 wherein the output and state-control windings of each core are serially coupled to the state-control and output windings, respectively of two different cores.

References Cited

UNITED STATES PATENTS

| | | | |
|---|---|---|---|
| 2,917,727 | 12/1959 | Reach | 340—174 |
| 3,083,354 | 3/1963 | Hanewinkel | 340—174 |
| 3,164,810 | 1/1965 | Harding | 340—174 |
| 3,222,658 | 12/1965 | Bruce et al. | 340—174 |
| 3,351,924 | 11/1967 | Meyerhoff et al. | 340—174 |
| 3,405,399 | 10/1968 | Chong et al. | 340—174 |

BERNARD KONICK, Primary Examiner

K. E. KROSIN, Assistant Examiner

U.S. Cl. X.R.

340—173